No. 658,979. Patented Oct. 2, 1900.
J. DAVIS.
MEANS FOR CLEANING GRANULAR FILTER BEDS.
(Application filed Feb. 26, 1900.)
(No Model.) 5 Sheets—Sheet 1.
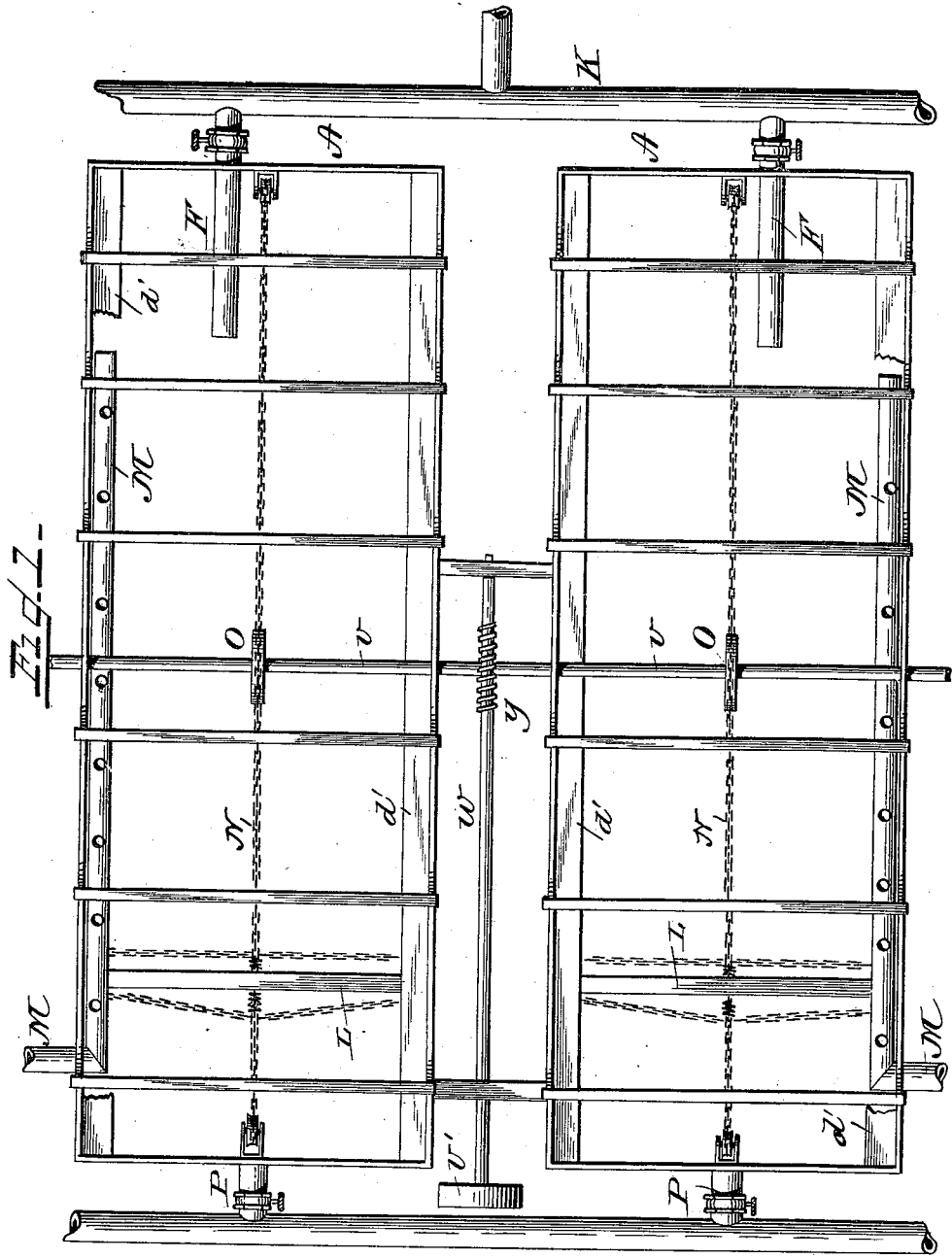

No. 658,979. Patented Oct. 2, 1900.
J. DAVIS.
MEANS FOR CLEANING GRANULAR FILTER BEDS.
(Application filed Feb. 26, 1900.)
(No Model.) 5 Sheets—Sheet 2.
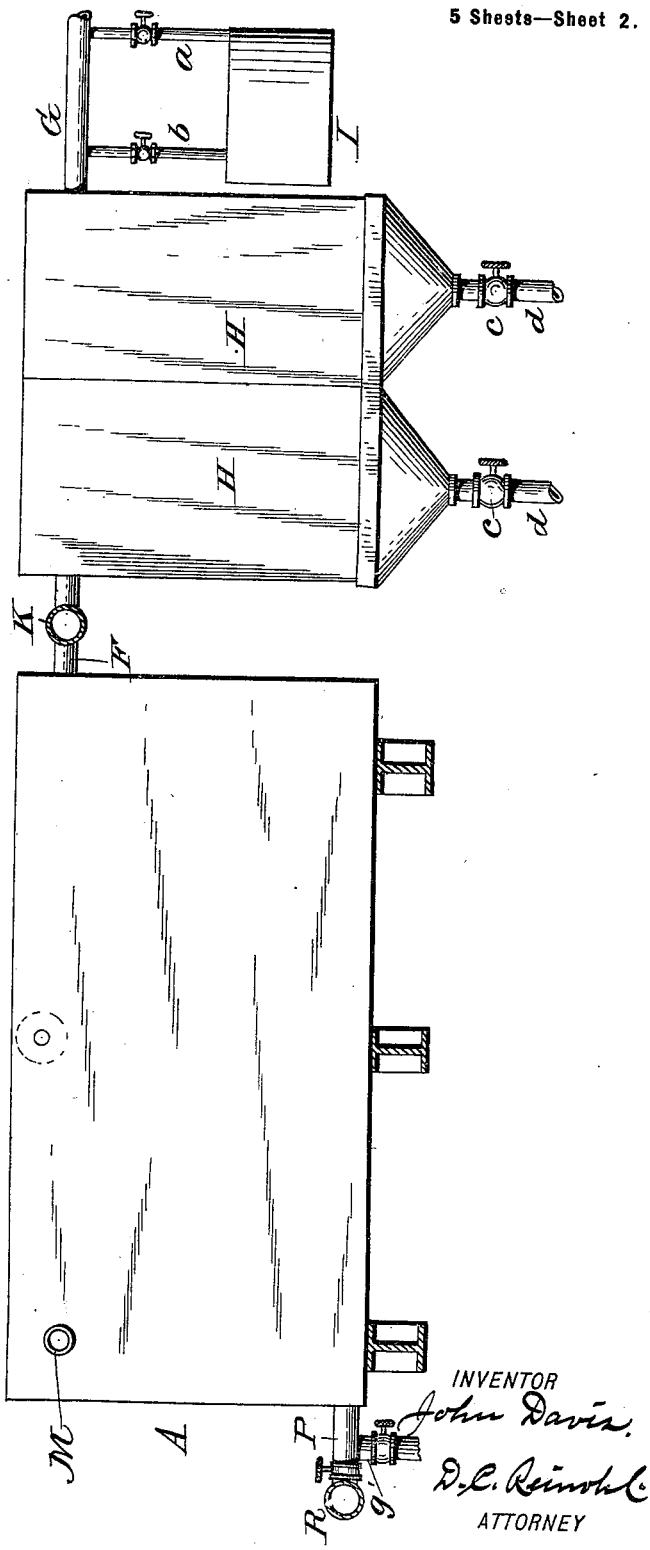
WITNESSES:
INVENTOR
ATTORNEY

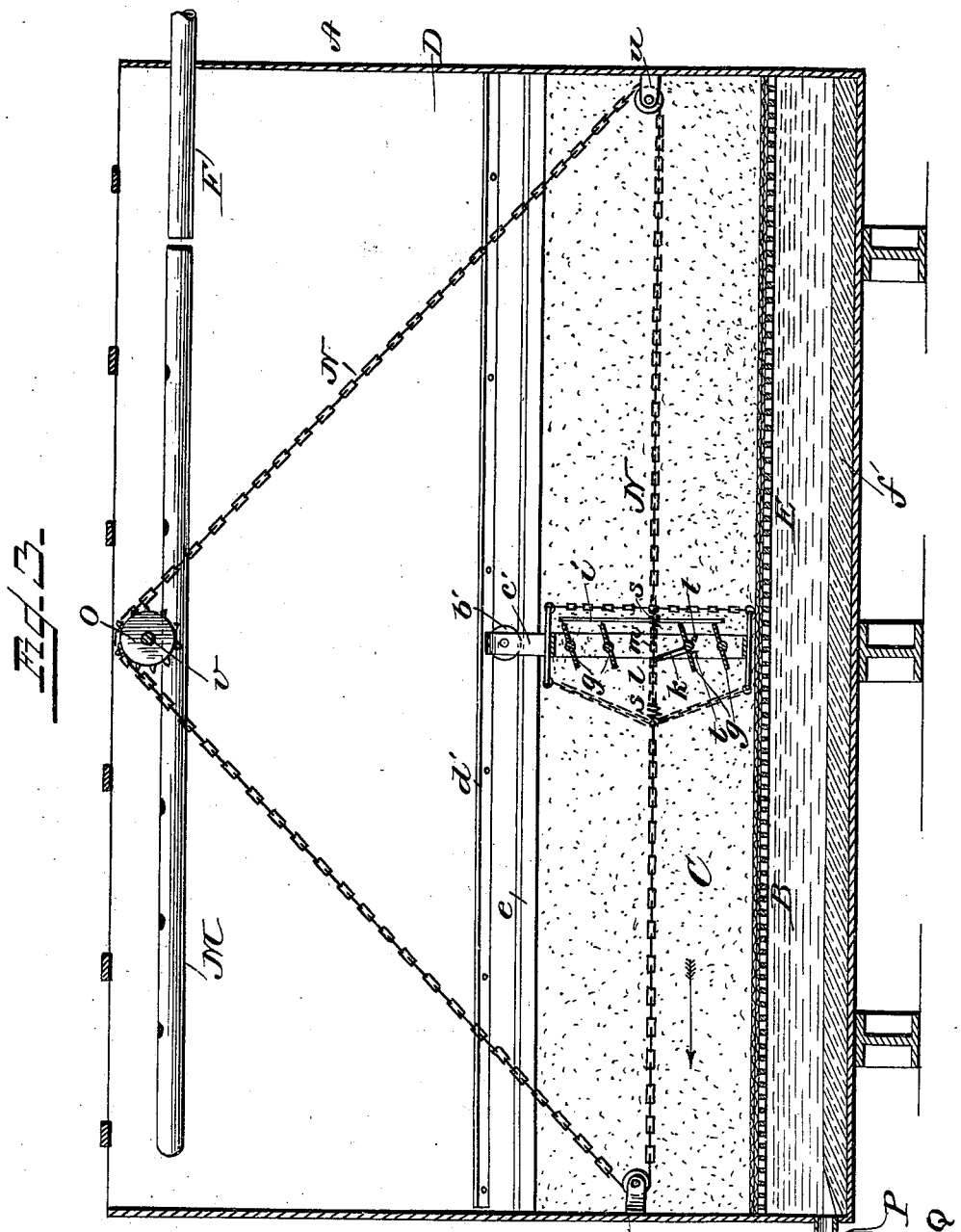

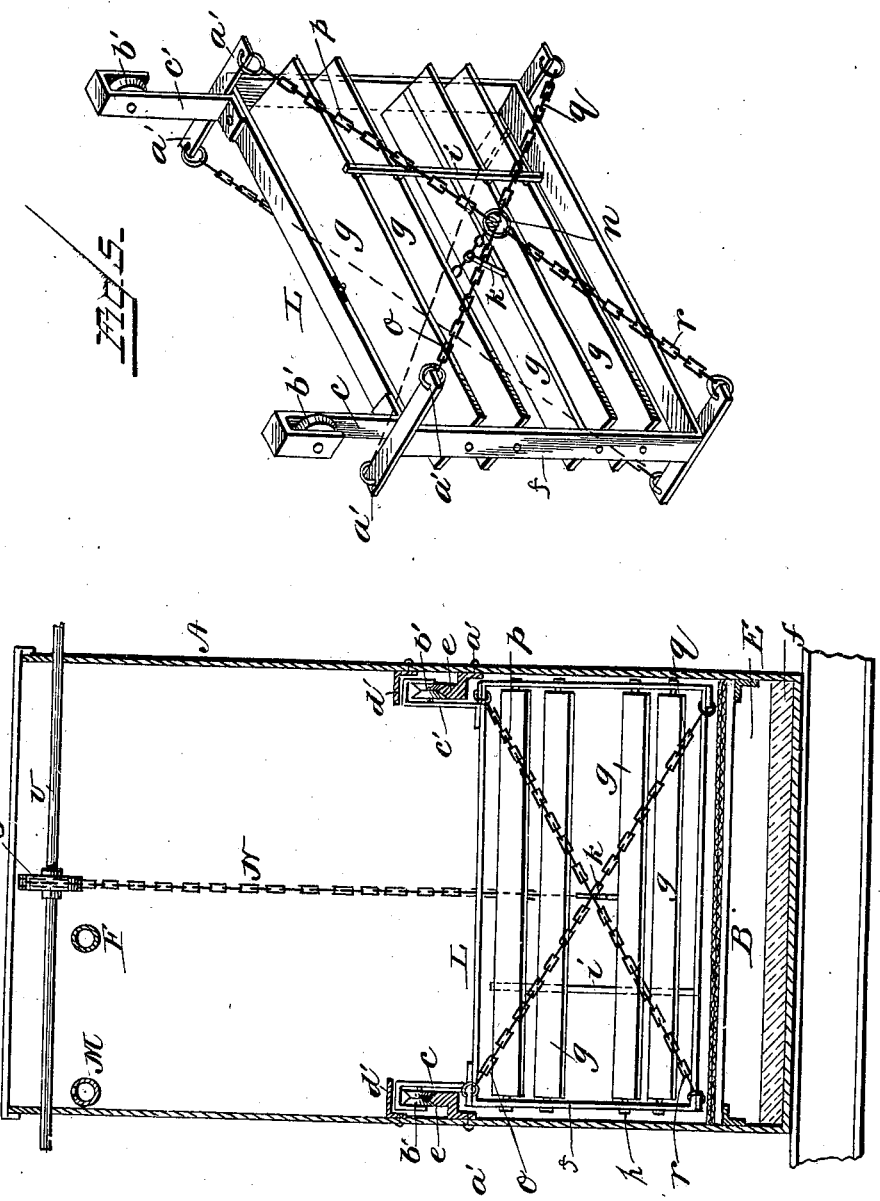

No. 658,979. Patented Oct. 2, 1900.
J. DAVIS.
MEANS FOR CLEANING GRANULAR FILTER BEDS.
(Application filed Feb. 26, 1900.)
(No Model.)
5 Sheets—Sheet 5.
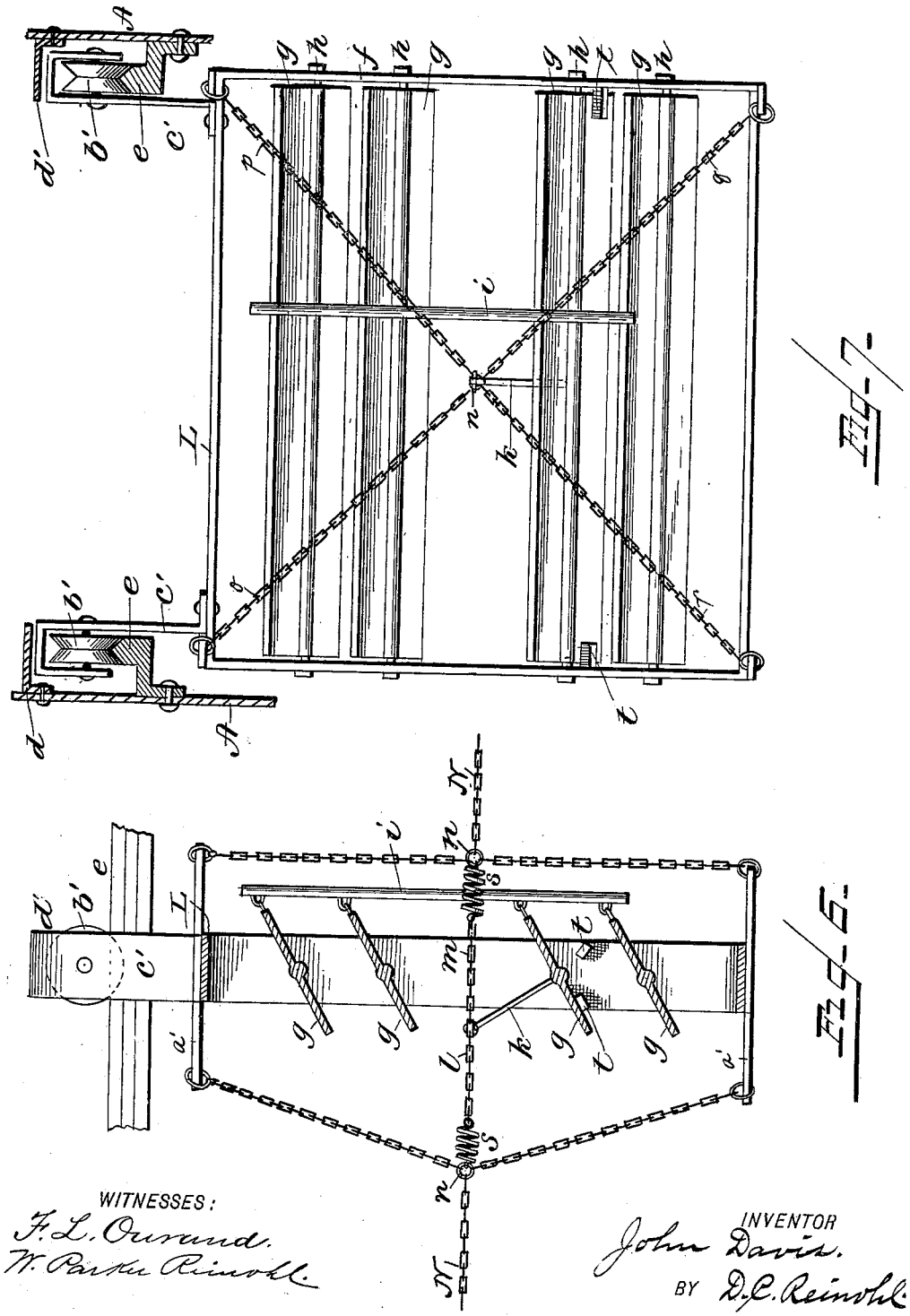
WITNESSES:
INVENTOR
John Davis.
BY
ATTORNEY

United States Patent Office.

JOHN DAVIS, OF PITTSBURG, PENNSYLVANIA.

MEANS FOR CLEANING GRANULAR FILTER-BEDS.

SPECIFICATION forming part of Letters Patent No. 658,979, dated October 2, 1900.

Application filed February 26, 1900. Serial No. 6,586. (No model.)

*To all whom it may concern:*

Be it known that I, JOHN DAVIS, a citizen of the United States, residing at Pittsburg, in the county of Allegheny and State of Pennsylvania, have invented certain new and useful Improvements in Means for Cleaning Granular Filter-Beds; and I do hereby declare the following to be a full, clear, and exact description of the invention, such as will enable others skilled in the art to which it appertains to make and use the same.

My invention relates to filters, has especial reference to that class of filters known as "gravity-filters," used in batteries or systems for supplying cities or towns with filtered water, has for its object the agitation and cleansing of the granular filter-bed, and consists in certain improvements in construction, which will be fully disclosed in the following specification and claims.

In the accompanying drawings, which form part of this specification, Figure 1 represents a plain view showing two filters of a battery; Fig. 2, a side elevation including the precipitating-chambers; Fig. 3, a vertical longitudinal section of one of the filters on an enlarged scale; Fig. 4, a vertical transverse section; Fig. 5, a perspective of the agitator on an enlarged scale; Fig. 6, a transverse section of the same, showing the means for reversing the blades; and Fig. 7, a front elevation of the same.

Reference being had to the drawings and the letters thereon, A indicates the filters, to be used in a battery, rectangular in form and open at the top, each of which is provided with a bottom B, of any preferred construction, and supports a granular filter-bed C, such as are commonly used for the purpose, and is contained in the filtering-chamber D, and below the bottom B is a chamber E to receive the filtered water as it descends through the filter-bed. Each filter A is provided with a supply-pipe F, which discharges the water to be filtered above the filter-bed.

The water flowing from the source of supply is conducted through pipe G into one or more precipitating or settling chambers H, and on its way thereto part of the water is diverted by a pipe *a* into a chamber I, containing a suitable chemical for coagulating the impurities contained in the water, and the water impregnated with the chemical is conducted from the chamber I through pipe *b* into the pipe G and flows into the chamber or chambers H, where the water remains long enough for the coagulated impurities to precipitate, and they are discharged through valve *c* in pipe *d*, as shown in Fig. 2, and the water, relieved of a large percentage of its impurities, flows from the chamber H through pipe K, to which the pipe F of the several filters is connected.

On each side of the filter A is a track *e*, extending the length of the filter, and upon said tracks is suspended or supported the agitator L, and consists of a frame *f*, in which are blades *g*, having shafts or axles *h*, engaging the ends of the frame, and the blades are connected by a rod *i* to cause them to move together as they are reversed at each end of the filter to change their angle of inclination In the travel of the agitator the blades are inclined downward at an angle of about twenty degrees to lift or raise the filter-bed and allow the water passing up through the separated granules to thoroughly cleanse them by contact with the blades and by attrition of the particles, and as the impurities rise to the surface of the water they are collected in the waste-pipe M and conducted out of the filter. The blades *g* are reversed by an arm *k*, attached to the axle *h* of one of the blades and is provided with a chain *l* on one side and *m* on the opposite side, which connect the arm to the ring *n* of the four chains *o*, *p*, *q*, and *r* at each end of the frame *f* of the agitator L, and to the ring *n* is attached the traction or draft chain N. The chains *l* and *m* may each be provided with a helically-coiled spring *s* to properly adjust the chains as to length if a little too short when the agitator is being moved in either direction, and the blade to which the axle *h* is attached is provided with stops *t t* to limit the degree of incline of the blades and form a support therefor as the agitator is being moved through the filter-bed. The number of blades in the agitator may be varied to suit the work required to be done. The chain N extends from each end of the agitator to the end of the filter, passes over a sheave *u*, and thence to and engages a sprocket-wheel O, supported upon a shaft $v$, which extends across the line of filters forming a battery and is connected to a power-shaft $w$ by suitable gearing $y$ and a clutch (not shown) on the shaft $v$ for each filter, so that any filter in the battery can be cleaned separately from the others or while they are at work filtering water.

Any suitable clutch mechanism may be applied to the shaft $v$ to throw it in and out of gear, and the shaft $w$ may be connected to a motor by a pulley $v'$ or by any preferred means.

At each corner of the frame $f$ of the agitator L are arms $a'$, to which the chains $o, p, q$, and $r$ are attached, respectively, and the arms are of a length to hold the chains out of engagement with the blades $g$, and the agitator is suspended upon the tracks $e$ by wheels $b'$, supported in brackets $c'$, attached to the upper side of the frame, as shown in Figs. 3, 4, 5, 6, and 7, and above the track and wheels is a guard $d'$, secured to the wall of the filter, as shown in Fig. 7.

The chamber E below the filter-bed is preferably provided with a bottom $f'$ of cement, and filtered water from said chamber is discharged through pipe P into a branch $g'$, leading to the service-main Q for distribution, and the pipe P also connects with pipe R, extending along one end of the battery of filters, for supplying clean water from one filter to cleanse another filter, which is accomplished by the use of a pump, (not shown,) and the proper manipulation of the valves in the several pipes, well known to every skilful engineer and need not therefore be further elucidated herein.

When it is desired to clean a filter, the supply of water to said filter is cut off, and filtered water drawn from another filter or filters in the battery is pumped into the chamber E of the filters to be cleaned and forced up through the filter-bed, and as soon as the granules become loosened the shaft $w$ and the shaft $v$ are revolved and the chain N set in motion, which draws the agitator L to one end of the filter, raising and agitating the granules and allowing the water to pass freely between them. When the agitator reaches the end of the filter toward which it is traveling, the motion of the shaft $v$ is reversed and the agitator drawn toward the opposite end of the filter, the angle of the blades $g$ being reversed by the chain $l$ or $m$, as the case may be, and by the chain N. This is repeated until the granules are thoroughly cleansed by attrition and the dirty water discharged through pipe M, and after the filter-bed has been cleansed the position of the several valves is again changed and the filter restored to work in the battery of filters.

Having thus fully described my invention, what I claim is—

1. A filter provided with an agitator crossing the filter transversely; in combination with a shaft and a chain for moving the agitator longitudinally in the filter.

2. A filter provided with an agitator consisting of a frame having blades pivotally secured therein and crossing the filter transversely; in combination with means for moving the agitator longitudinally in the filter.

3. A filter provided with an agitator consisting of a frame having blades pivotally secured therein and crossing the filter transversely, and a track supporting the agitator; in combination with means for moving the agitator longitudinally in the filter.

4. A filter provided with an agitator consisting of a frame having blades pivotally secured therein and crossing the filter transversely, and a track supporting the agitator; in combination with a chain connected to each end of the frame, and a shaft connected to said chain to move the agitator in opposite directions in the filter.

5. A filter provided with an agitator consisting of a frame having blades pivotally secured therein and crossing the filter transversely, chains connected to the four corners of the frame on each side thereof, and a track supporting the agitator; in combination with a chain connected to the chains at each end of the agitator and a shaft for moving the agitator longitudinally in the filter.

6. A filter provided with an agitator consisting of a frame having blades pivotally secured therein, and lateral extensions at each corner and on both sides of the frame, chains connected to said extensions and joined in the center of the agitator; in combination with means for moving the agitator longitudinally in the filter.

7. A filter provided with an agitator consisting of a frame having blades pivotally secured therein, chains connected to each corner of the frame and on both sides thereof and joined in the center of the frame, a connection for reversing the blades, and a track supporting the agitator; in combination with a chain connected to the chains on both sides of the frame, and means for moving the agitator longitudinally in the filter.

In testimony whereof I affix my signature in presence of two witnesses.

JOHN DAVIS.

Witnesses:
J. C. BOYER,
JAMES McLAREN.